UNITED STATES PATENT OFFICE.

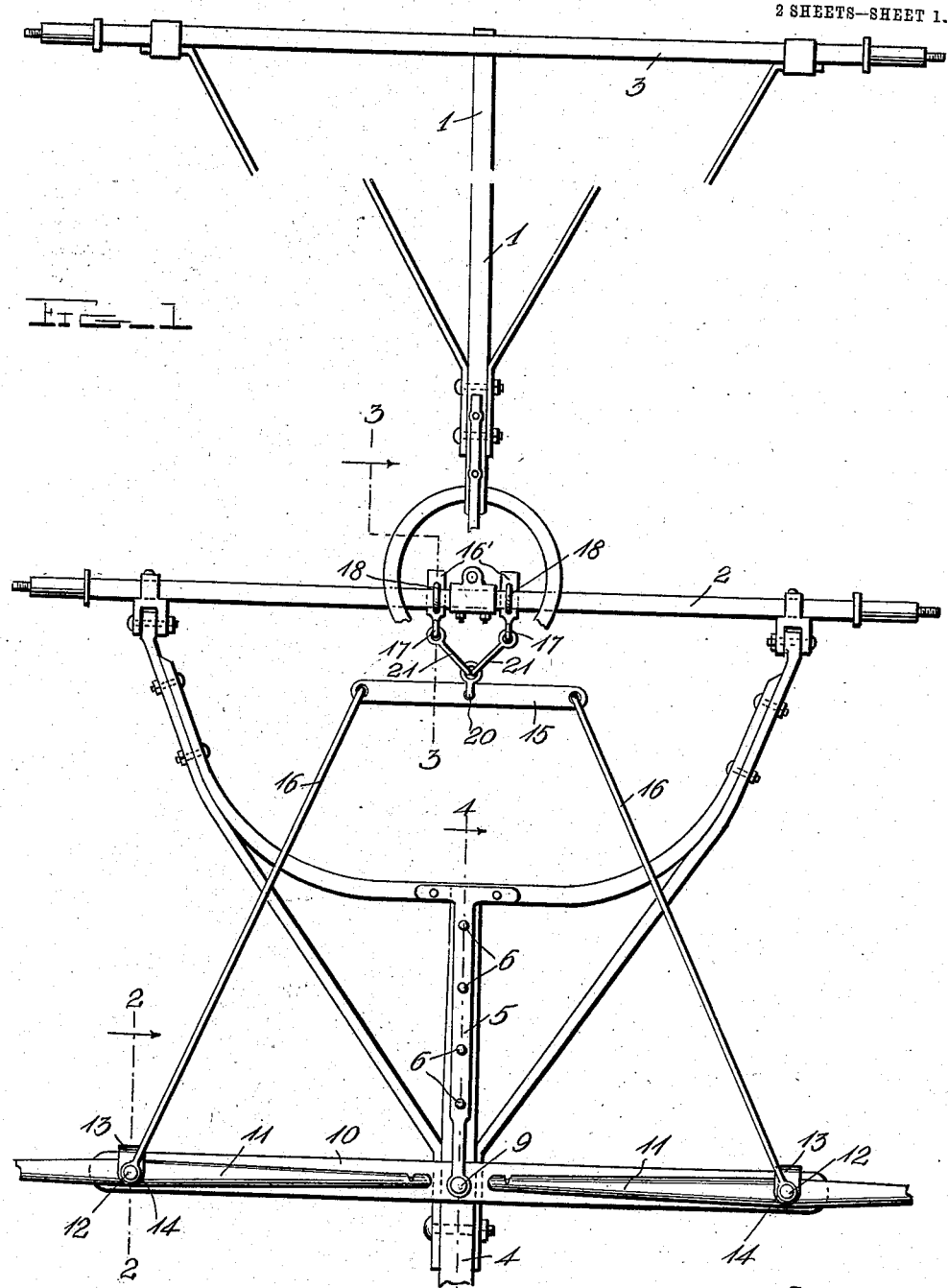

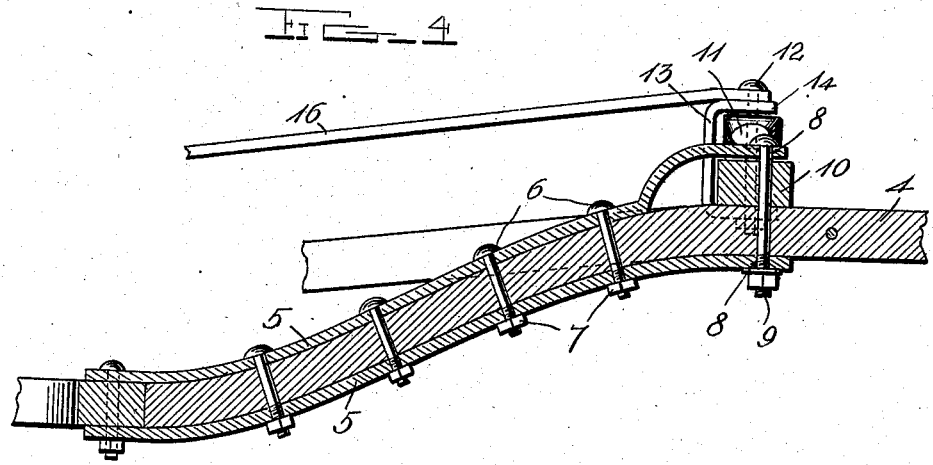
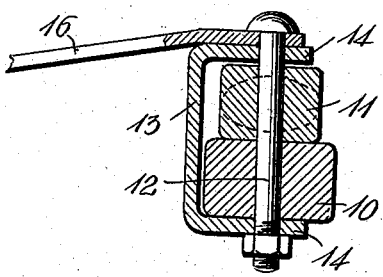
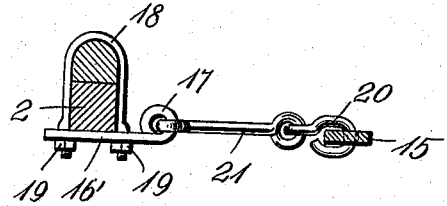

JOSEPH S. LEWIS, OF VILLISCA, IOWA.

VEHICLE RUNNING-GEAR.

No. 899,877.    Specification of Letters Patent.    Patented Sept. 29, 1908.

Application filed October 7, 1907. Serial No. 396,282.

*To all whom it may concern:*

Be it known that I, JOSEPH S. LEWIS, a citizen of the United States, residing at Villisca, in the county of Montgomery and State of Iowa, have invented certain new and useful Improvements in Vehicle Running-Gears; and I do declare the following to be a full, clear, and exact description of the invention, such as will enable others skilled in the art to which it appertains to make and use the same.

This invention has relation to new and useful improvements in vehicle running gear.

The principal object of the invention is to add durability to the whiffle trees by holding them upright and at the same time obviate subjecting the pivot bolts for the whiffle trees to twisting strains, as is now the case.

A further object of the invention is to provide an arrangement whereby the central or intermediate portion of the front axle, as well as the ends of such axle will sustain a part of the draft so that such axle will not become bent backward in the middle by backward pull of the reach.

With the foregoing and other objects in view, that will readily appear as the nature of the invention is better understood, the invention resides in the novel features of construction, combination and arrangement of parts, as will be more fully described and particularly pointed out in the appended claims.

In the accompanying drawings: Figure 1 is a plan view of a vehicle running gear provided with my improvements. Fig. 2 is a cross-sectional view taken on the line 2—2 of Fig. 1, looking in the direction indicated by the arrows. Fig. 3 is a cross-section taken on the line 3—3 of Fig. 1 and looking in the direction indicated by the arrows; and Fig. 4 is a sectional view taken on the line 4—4 of Fig. 1.

Referring more particularly to the drawings which are for illustrative purposes only, and therefore not drawn to any particular scale, 1, indicates the reach, 2 and 3, the front and rear axle, respectively, and 4 the tongue of an ordinary vehicle running gear.

Fastening plates, 5, are arranged on opposite faces of the tongue, by bolts and nuts, 6 and 7, respectively, or their equivalent means, and are provided at their front ends with vertical alining eyes or apertures, 8, for the reception of a pivot bolt, 9, for pivotally securing the main double tree, 10, in position.

Whiffle trees, 11, are pivoted centrally of their ends to the upper face of the double tree by pivot bolts, 12, and U-shaped members, 13, are arranged at the pivot points of the whiffle trees, and to have their arms, 14, positioned at the upper and under faces and face of the whiffle trees, and double tree, respectively.

An equalizer bar, 15, is arranged slightly in front of the central or intermediate portion of the front axle, and is connected with the pivot bolts, 12, by horizontally disposed connecting rods or members, 16, removably connected at their inner hooked ends in corresponding eyes or apertures near the ends of said whiffle tree and at their front eyed ends with the pivot bolts, 12, at points above the upper arms of the U-shaped members.

From the construction illustrated and defined it will be perceived that the arrangement of the parts is such that the front ends of the connecting rods or members prevent the whiffle trees from twisting forwardly, while sustaining the draft. Said equalizer-bar, 15, is preferably sustained in operative position to the front axle, by the following arrangement. Two transversely spaced fastening plates or members, 16', having suitable hooks, 17, at their front ends, are adjustably fastened under the central or intermediate portion of the front axle, by clips, 18, and nuts, 19. A link, 20, is attached to the equalizer-bar centrally of the ends thereof, and obliquely disposed connecting links, 21, are arranged between the fastening bolts or members, 16', and the link, 20, said links, 21, having eyes at their rear or inner ends to receive the hooks of the fastening bolts or members, and hooks at their front ends for engaging the link, 20.

From the foregoing description taken in connection with the drawings, it is thought that the construction and operation, and objects of the invention will be readily understood without requiring a more extended explanation.

Having thus described my invention, what I claim as new and desire to secure by Letters-Patent, is:

In a device of the class described, the combination with a front axle, of a draft device secured thereto, a double-tree upon said draft device, swingle-tree bolts carried at the end of the double-tree, converging links connected to the swingle-tree bolts, a draft lever connected to the inner ends of the converging links, a central eye connected to the draft lever, a pair of diverging links connected to the eye and extending rearwardly toward the axle, and clips having hooks to engage the links, said clips being adjustably mounted toward and away from each other upon the axle so as to shorten or lengthen the connection between the draft bar and the axle.

In testimony whereof I have hereunto set my hand in presence of two subscribing witnesses.

JOSEPH S. LEWIS.

Witnesses:
S. H. COLEMAN,
LEE BRECKENMAKER.